Patented Oct. 25, 1927.

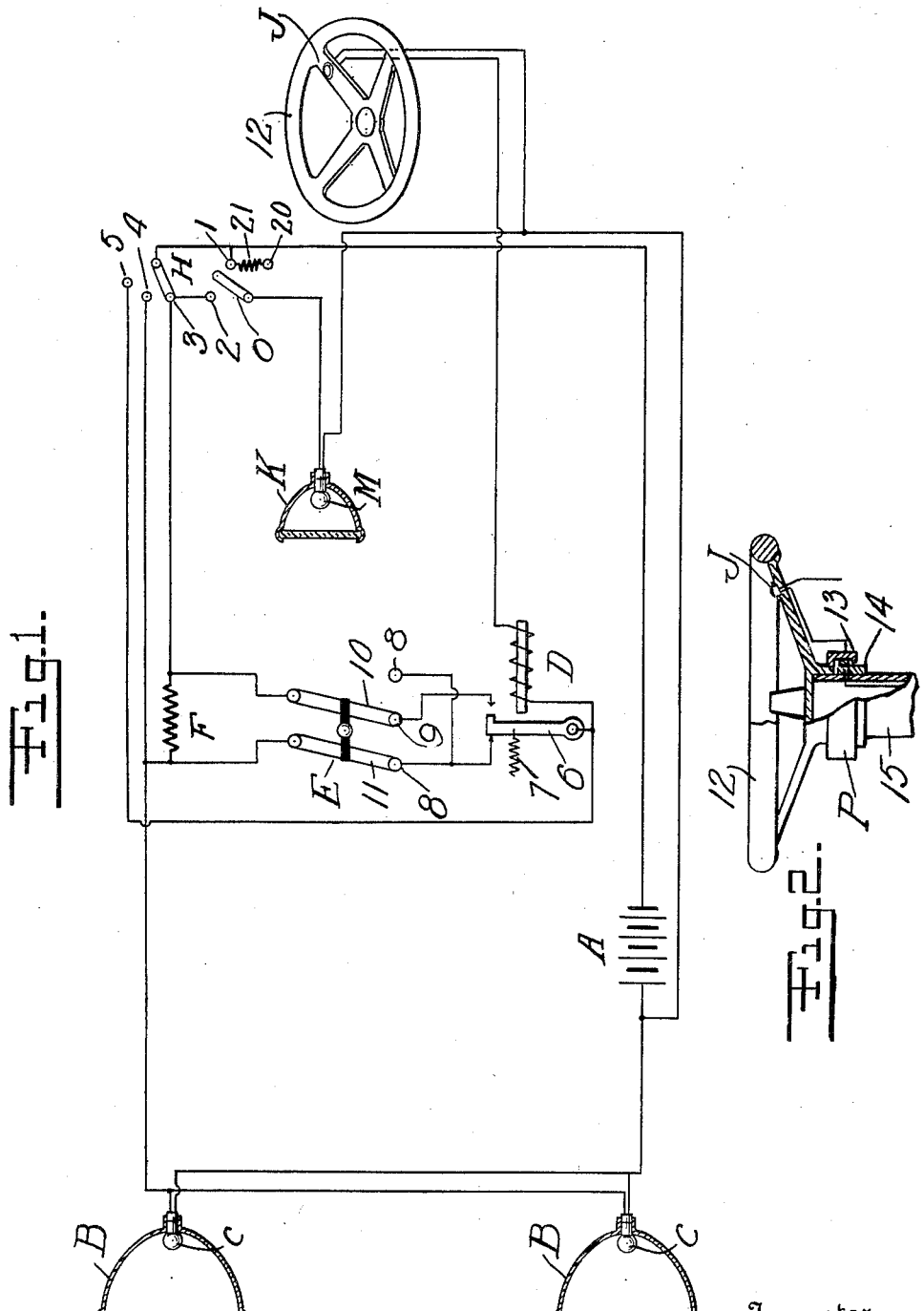

1,646,860

UNITED STATES PATENT OFFICE.

GULIELMUS V. HEIDT, OF ATLANTA, GEORGIA.

CONTROL FOR ELECTRICAL SYSTEMS.

Application filed February 16, 1923. Serial No. 619,513.

This invention relates to electrical systems and circuits in general, and more particularly to the control of electric lighting, heating and power systems and circuits under varying conditions.

My invention further relates to an improved means for varying the potential of incandescent electric lighting systems, particularly electric headlights adapted and designed for installation and use on motor propelled vehicles.

The primary object of my invention is to provide a simple, yet positive, means whereby the night operation upon unlighted country roads of motor vehicles may be rendered more safe by controlling the potential, and therefore the brilliancy, of the electric headlights, and through this improved means of control to eliminate one of the large contributing factors of automobile accidents. This object of my invention and the large part it is destined to play in the conservation of life and property, will be more clearly understood by noting that the safe operation of a motor car travelling at say twenty miles per hour, requires a headlight which is capable of illuminating the roadway ahead for a distance of at least one hundred and fifty feet, because that distance practically corresponds with the distance travelled by the motor car in five seconds of time and if an approaching car with a similar headlight is travelling at a like speed, the two motor cars will together illuminate three hundred feet of roadway five seconds before the moment they are due to speed past each other.

As the developed brake horse-power and speed of motor cars has increased, so also has the necessity for proportionately more powerful headlights increased, and auxiliary lighting devices, such as spot-lights and searchlights, are now installed on motor cars to further aid the drivers of motor cars when travelling at night on country roads, as it is apparent that if the speed is doubled, the beam of light must be projected double the former distance to maintain the former margin of safety.

This problem and the immediate necessity for its correct solution as indicated diagrammatically in the accompanying drawings will likewise be more clearly understood by further noting that the greater the results attained by manufacturers in producing powerful automobile headlights, the greater has been the accompanying disadvantage, because the use of powerful head lights to illuminate the roadway a safe distance in advance of the motor car, has the inevitable result of also directing that light at the driver of an approaching motor car, who, if his car is similarly equipped with a strong headlight, will inevitably direct that light similarly at the driver of the first mentioned car, resulting in the mutual temporary blinding of each driver by the other, when their cars are but a short distance apart and speeding towards each other, and at the very time and place where great care must be observed to accomplish a safe passing of the two cars.

The problem to which my invention particularly pertains in this instance, therefore, is to provide a means whereby these powerful headlights on motor vehicles may be continued in use but deprived of their dangerous disadvantage by being instantly, though momentarily, dimmed during the passing of two cars, it being also noted that the combined headlights of the two approaching cars have illuminated the roadway well in advance of each car, and thereby decreased the necessity for the more powerful headlight during the passing of the two cars.

Having thus stated the problem to be solved, and the primary object of my invention, it may be noted that additional objects include the following:

1. To provide means as above described, comprising apparatus positive in its operation, but flexible and susceptible to instant change in potential from strong to weak current or vice-versa, to meet any of the varying conditions and ever present dangers of motor car travelling at night in either town or country.

2. To provide means as above described comprising simple and inexpensive apparatus which can be readily and quite easily installed by unskilled mechanics as a part of, and auxiliary to, the ordinary and usual incandescent electric lighting system of any motor vehicle.

3. To provide means and apparatus as above described, light in weight, small in compass and adaptable for installation in part on the steering wheel and in part on the dashboard of an automobile, so as to be convenient and accessible for constant use to accomplish instantaneously the dimming or brightening of the headlights for either a short or long period of time.

Further objects of my invention will be obvious from a close study of the accompanying drawings by those skilled in this art, while other objects will appear, or be, in part, specifically pointed out and referred to in the following more detailed description and the appended claims, it being understood that this invention resides in the particular combination and organization of parts, set forth herein and otherwise indicated in the preferred embodiment of my invention, as shown by the drawings where similar reference characters refer to similar parts.

In the accompanying drawings:

Figure 1 is a sketch diagrammatically indicating certain electrical connections which are designed to accomplish the objects of my invention.

Figure 2 shows partly in elevation that portion of my invention as pertains to the electrical connections which I have preferably located on the steering wheel of a motor vehicle, vessel or aeroplane, as the case might be.

The preferred embodiment of this invention, as shown in the drawings, comprises the storage battery, (or other source of electric current) A; one or more headlights B having electric bulbs C permanently connected (either in series or in multiple) to one pole of the battery A; electro-magnetic switch D; manual transposition switch E; electrical resistance F; hand control switch H; and steering wheel push button switch J. As a modification the spotlight K, having electric bulb M also permanently connected to said one pole of said battery, and hand control spotlight switch O is also shown in Figure 1. As a further modification, the slip-ring sliding contact P is indicated in Figure 2, as a suggested means which may be employed on the steering wheel supplemental to the wiring connections for the push-button switch J.

In the manual operation of my control system, as applied to headlights, when less than full brilliancy of the headlights is desired, the switches O and J, remain in their open position as shown in the drawings, and the switch H, remains closed on contact point 3 as also shown in the drawings. It will be noted that when the switch H is closed on contact point 3 that the current from battery A must flow through resistance F to reach the headlight bulb C, thereby resulting in less than full current flowing to bulb C. When, however, full brilliancy of the headlights is desired, the switch H is moved to the right from contact point 3 and closed on contact point 4, in which case it will be noted that the current from battery A now flows directly to the bulbs C without the interposition of the resistance F, thereby resulting in full current flowing to bulbs C and full brilliancy of said bulbs.

It should be noted as a modification, that by having the switch O remain closed on contact point 2, the spotlight K will be automatically coupled to the headlights B and placed in operation and use at full brilliancy whenever the switch H is closed on contact point 3; and that said spotlight K is placed in operation and use at a reduced brilliancy when the switch H is moved from contact point 3 to contact point 4. This modification permits selectively the automatic coupling up of the spotlight K with the headlights B and is an advantageous arrangement under certain conditions, such as where the roads are bad and present elements of uncertainty and consequent danger, such as sharp turns, and where, due to traffic approaching from the opposite direction it is deemed advisable to use the headlights for the time being in a dimmed condition, with the spotlight at full brilliancy but diverted from the eyes of the approaching drivers, as an auxiliary means of illumination to supplement the dimmed headlights. This suggested coupling, permitting the combination of dimmed headlights and undimmed spotlight, or conversely undimmed headlights and dimmed spotlight, is believed to be a most advantageous combination for general use, but it is quite evident that the headlights and spotlight may be otherwise interconnected to produce other combinations.

It may be further noted that said spotlight K may at all times be independently operated and used at full brilliancy by moving switch O to contact point 1, should that modified arrangement be deemed advantageous under certain conditions. Contact 20 and resistance 21 indicate another modification and means for independently dimming spotlight K.

In the electro-magnetic operation of my control system as applied to headlights, the switch H is moved to the right across contact points 3 and 4 to contact point 5, resulting in the flow of battery current through the normal contact maintained by the armature 6, aided by the spring 7 and thus to the extreme left and right contact points 8 of the switch E. Should the switch E be thrown over to the extreme left, as shown in Figure 1, the right blade 10 of said switch is on contact point 9 and it will be seen that as long as the armature 6 remains in the normal position shown in the drawings, the battery current must flow direct from left contact point 8 to the headlight bulbs C. When, however, the push-button switch J is closed, battery current will energize the electro-magnet D causing the armature 6 to move to the right and out of contact with contact points 8, and into electrical contact with contact point 9 of the switch E, causing the current supplying the bulbs C to first flow through the resistance F, and thereby resulting in the instantaneous dimming of said headlights B, due to drop in potential.

Should, however, the switch E be thrown over to the right, so that the left blade 11 of said switch is on contact point 9, it will be seen that as long as the armature 6 remains in the normal position shown in the drawings, the battery current must flow from right contact 8, then through resistance F to the bulbs C, resulting in the said bulbs burning at a decreased brilliancy due to receiving less than full strength of current from said battery A. When, however, the switch J is closed, the armature 6 will be moved out of electrical contact with right contact point 8 and into electrical contact with contact point 9 causing the battery current to now flow direct and in full strength to said bulbs C, resulting in the instantaneous increased brilliancy of said headlights B due to a rise in potential.

As a further modification, it is to be noted that in the above described electro-magnetic control for headlights, the spotlight K may, if desired, be readily coupled and automatically operated by moving the switch O to contact point 2 when it will be seen that whenever the battery current is flowing undiminished through the left blade 11 of switch E direct to the bulbs C, a current passing through the resistance F will now flow through the bulb M of the spotlight K which will burn at a decreased brilliancy. When, however, the battery current is flowing through the right blade 10, of switch E to the bulbs C through the resistance F, the bulb M will receive current from battery A unchanged as to potential, and therefore said spotlight K will burn at full brilliancy.

In Figure 2 is shown a modified means for accomplishing part of the electrical connections to the push-button switch J on the steering wheel 12 by means of the contact rings 13 and 14, which are in movable electrical contact with respect to each other but rigidly attached to the wheel 12 and the post 15 respectively. The rings 13 and 14 are however insulated from wheel 12 and post 15 respectively, so that there is actually no electrical connection between the switch J and said wheel 12 or post 15. Any of the well known types of movable contact suitable for the purpose herein may be employed in the carrying out of this modification in combination with the switch J if deemed advantageous.

I am well aware that previous attempts have been made to correctly solve this problem of providing adequate headlights for automobiles and at the same time render it possible for two cars thus equipped to approach each other without the possibility of temporarily directing a portion of the light into the eyes of the drivers of the approaching cars. In addition to certain alleged improvements in headlight lenses and devices for moving the headlight, there have been some attempts to design dimming devices. I therefore, desire it to be understood that my invention is entirely distinct and different in scope from those previous makeshift or otherwise complicated devices, which depend for their operation, upon the employment of two independent sets of lamps, differing in candlepower, which are alternately switched on and off as may be desired. I also desire at this time to point out that my invention is also distinct and different from that other class of devices which do not employ an electro-magnetic switch independently operated and controlled by a push-button switch, or other similar means, located on the steering wheel such as indicated in the accompanying drawings and described herein.

Although I have, for the purpose of avoiding complicated wiring, indicated certain switch units, it is apparent certain functions now performed by said switches could, by combination and adaptation, as easily, if not also more advantageously, be performed by specially designed switches.

It will also be apparent to those skilled in this art, that my invention is neither limited or confined exclusively to incandescent electric lighting circuits and systems, but may be readily adapted to and advantageously employed in the control of various other electrical units, apparatus and devices, such as in electric heating and power circuits and systems.

Having now completed a detailed description of the relative arrangement and position of the various parts embraced in the present and preferred embodiment of my invention, in order to impart a full, clear and exact understanding of the combination and operation of the same, it should be understood that while I prefer to practice my invention as described and with apparatus of the general character shown, I do not thereby mean to limit the use of my invention to such specific apparatus and arrangement of parts, as various additional modifications may be employed in practice as fairly fall within the scope of my invention and the appended claims without departing from the spirit and evident intent of same.

I claim:

1. In a control for an electric system, the combination of an electrical member, a source of electrical energy for supplying said member, connections between the member and source, a resistance unit, a manually operated switch in said connections adapted to interpose said resistance unit between said member and source, an electrically operated switch adapted to interpose said resistance unit between said member and source, and means for transposing the electrical connections between said resistance and said electrically operated switch.

2. An electric lighting system for vehicles combining a source of energy, headlights in circuit with the source of energy, a spotlight in shunt with said circuit, a resistance unit in operative relation with each circuit, and means comprising a reversible switch to connect either of said circuits to the resistance unit to change the brilliancy of either the headlights or spotlight.

3. An electric lighting system for vehicles combining a source of energy, headlights electrically connected to the source, a spotlight electrically connected to the source, means to dim the headlights without dimming the spotlight, and auxiliary means comprising an independent resistance unit and a reversing switch to dim the spotlight without dimming the headlights.

4. In a system adapted for the control of electric headlights on vehicles, the combination of a source of energy, a plurality of inter-connected lamps, a circuit of relatively low resistance connecting said lamps to said source, a relatively high resistance unit, manually operated means comprising a reversible switch adapted to interpose the relatively high resistance into said circuit, and auxiliary electrically operated means similarly adapted to interpose said high resistance into said circuit.

5. In a system adapted for the control of electric headlights on vehicles, a combination of a source of energy, a plurality of interconnected lamps, circuits of relatively high and low resistance connecting said lamps to said source, manually operated means comprising a reversible switch adapted to break said high resistance circuit and connect said lamps through the relatively low resistance circuit to said source, and auxiliary electrically operated means adapted to connect said lamps to said circuits.

6. In a system adapted for the dimming of electric headlights by causing a change in potential in the electric circuit supplying said headlights, the combination of a source of energy, a pair of lamps, a circuit of relative low resistance connecting said lamps to said source, a circuit of relative high resistance connecting said lamps to said source, manually operated means comprising a reversible switch adapted to alternately connect and disconnect said circuits respectively to said source, and electrically operated means similarly adapted to alternately connect and disconnect said circuits respectively to said source.

7. In an electric system for controlling the brilliancy of electric lighting on vehicles, a source of electricity, a circuit connected to the source having a headlight, an auxiliary circuit connected to the source having a spotlight, manual means for independently connecting and disconnecting each of said circuits to said source, a resistance unit in operative relation to each of said circuits, manual means for alternately interposing said unit in said first mentioned circuit and in said auxiliary circuit respectively, and electrically operated means for similarly alternately interposing said unit in said first mentioned circuit and in said auxiliary circuit respectively.

8. In an electric system for controlling the brilliancy of electric lighting on vehicles, a source of electricity a circuit connected to the source having a headlight, an auxiliary circuit connected to the source having a spotlight, manual means for independently connecting and disconnecting each of said circuits to said source, a resistance unit in operative relation to each of said circuits, manual means for alternately interposing said unit in said first mentioned circuit and in said auxiliary circuit respectively, electrically operated means for alternately interposing said unit in said first mentioned circuit and in said auxiliary circuit respectively, and means auxiliary to said electrically operated means for transposing the electrical connections between said unit and said circuits respectively.

9. A device to control the brilliancy of electric headlights and auxiliary lighting on vehicles combining a source of electricity, a headlight connected to said source, an auxiliary light connected to said source, manually operated means to dim the headlights without dimming the auxiliary light, electrically operated means to similarly dim the headlight without dimming the auxiliary light, said manual and electrical means being also adapted to independently dim the auxiliary light without dimming the headlight.

10. In a device adapted for the lighting system of vehicles, a source of energy, a headlight connected to the source, an auxiliary light connected to the source, manual means comprising a resistance unit and a switch to dim the headlight without dimming the auxiliary light, said means being also adapted to similarly dim the auxiliary light without dimming the headlight, and auxiliary means comprising said unit a reversing switch and a distant controlled electro-magnet adapted to similarly dim said headlight without dimming said auxiliary light, said latter means being also adapted to dim said auxiliary light without dimming said headlight.

Signed at city of Fort Benning, in the county of Muscogee, and State of Georgia, this 1st day of February, A. D. 1923.

GULIELMUS V. HEIDT.